US012625691B2

(12) United States Patent
Tiwari et al.

(10) Patent No.: US 12,625,691 B2
(45) Date of Patent: May 12, 2026

(54) OPTIMIZING COMPONENTS FOR MULTI-CLOUD APPLICATIONS WITH DEEP LEARNING MODELS

(71) Applicant: INTERNATIONAL BUSINESS MACHINES CORPORATION, Armonk, NY (US)

(72) Inventors: Pranshu Tiwari, Sharon, MA (US); Harish Bharti, Pune (IN); Swarnalata Patel, Morrisville, NC (US); Naveen Narayanaswamy, Bengaluru (IN); Abhaya Kumar Sahoo, Khordha (IN)

(73) Assignee: International Business Machines Corporation, Armonk, NY (US)

( * ) Notice: Subject to any disclaimer, the term of this patent is extended or adjusted under 35 U.S.C. 154(b) by 282 days.

(21) Appl. No.: 18/096,191

(22) Filed: Jan. 12, 2023

(65) Prior Publication Data

US 2024/0241707 A1    Jul. 18, 2024

(51) Int. Cl.
*G06F 8/60* (2018.01)
*G06F 9/50* (2006.01)
*H04L 41/0823* (2022.01)

(52) U.S. Cl.
CPC .............. *G06F 8/60* (2013.01); *G06F 9/5061* (2013.01); *H04L 41/0823* (2013.01)

(58) Field of Classification Search
CPC .. G06F 8/60–66; G06F 9/5066; G06F 9/5061; H04L 41/08–0895
See application file for complete search history.

(56) References Cited

U.S. PATENT DOCUMENTS

| | | | |
|---|---|---|---|
| 7,072,960 B2 * | 7/2006 | Graupner | G06F 9/5072 |
| | | | 709/223 |
| 8,560,465 B2 * | 10/2013 | Jeong | G06N 5/02 |
| | | | 706/45 |
| 9,594,546 B1 * | 3/2017 | Todd | H04L 67/1097 |
| 9,722,858 B2 | 8/2017 | Markley et al. | |
| 10,033,833 B2 * | 7/2018 | Fu | H04L 67/34 |
| 10,205,677 B2 * | 2/2019 | Udupi | H04L 47/78 |
| 10,601,672 B2 | 3/2020 | Jeuk et al. | |
| 10,747,521 B2 | 8/2020 | Karagiannis et al. | |

(Continued)

OTHER PUBLICATIONS

Anonymous, "Cognitive Deployment Engine for Containers in a Hybrid Cloud Context", ip.com , Dated Jan. 26, 2021; 8 Pages.
(Continued)

*Primary Examiner* — Todd Aguilera
(74) *Attorney, Agent, or Firm* — Seed Intellectual Property Law Group LLP

(57) ABSTRACT

In various examples, a computer-implemented method includes: ingesting, by one or more computing devices, application deployment data for an application; generating, by the one or more computing devices, a cloud application deployment predictor data structure for the application; generating, by the one or more computing devices, objective functions for the cloud application deployment predictor data structure for the application; optimizing, by the one or more computing devices, between the objective functions for the application; and generating, by the one or more computing devices, based on the optimizing between the objective functions, a multi-cloud deployment map for the application.

20 Claims, 8 Drawing Sheets

(56) References Cited

U.S. PATENT DOCUMENTS

| | | | | |
|---|---|---|---|---|
| 10,789,089 | B2 | 9/2020 | Hari | |
| 11,469,965 | B2 * | 10/2022 | Kandaswamy | H04L 41/142 |
| 2003/0236822 | A1 * | 12/2003 | Graupner | G06F 9/5072 |
| | | | | 709/203 |
| 2007/0300239 | A1 * | 12/2007 | Adam | G06F 9/5066 |
| | | | | 719/320 |
| 2011/0004574 | A1 * | 1/2011 | Jeong | G06N 5/02 |
| | | | | 718/104 |
| 2013/0151688 | A1 * | 6/2013 | Widjaja | H04L 67/1097 |
| | | | | 709/224 |
| 2017/0149687 | A1 * | 5/2017 | Udupi | H04L 47/83 |
| 2017/0201569 | A1 * | 7/2017 | Fu | H04L 41/5045 |
| 2019/0012157 | A1 | 1/2019 | Karagiannis et al. | |
| 2019/0123973 | A1 | 4/2019 | Jeuk et al. | |
| 2020/0089515 | A1 | 3/2020 | Hari | |
| 2021/0367852 | A1 * | 11/2021 | Kandaswamy | H04L 41/0813 |
| 2022/0214917 | A1 * | 7/2022 | Chien | G06F 9/45558 |
| 2024/0370287 | A1 * | 11/2024 | Tiwari | G06F 9/45558 |

OTHER PUBLICATIONS

Ochei et al., "Optimal Deployment of Components of Cloud-Hosted Application for Guaranteeing Multitenancy Isolation", Journal of Cloud Computing: Advances, Systems and Applications, 2019; 38 Pages.

Anonymous, "Workload Discovery and Recommendations for Cloud Migration with AI", ip.com, Dated Sep. 23, 2020; 11 Pages.

Microsoft, "Azure Advisor", https://azure.microsoft.com/en-us/products/advisor/#overview, Accessed Jan. 11, 2023; 14 Pages.

Kyndryl, "Multicloud Management Platform", https://www.kyndryl.com/us/en/services/cloud/multicloud/multicloud-management-platform , Accessed Jan. 11, 2023; 10 Pages.

* cited by examiner

300

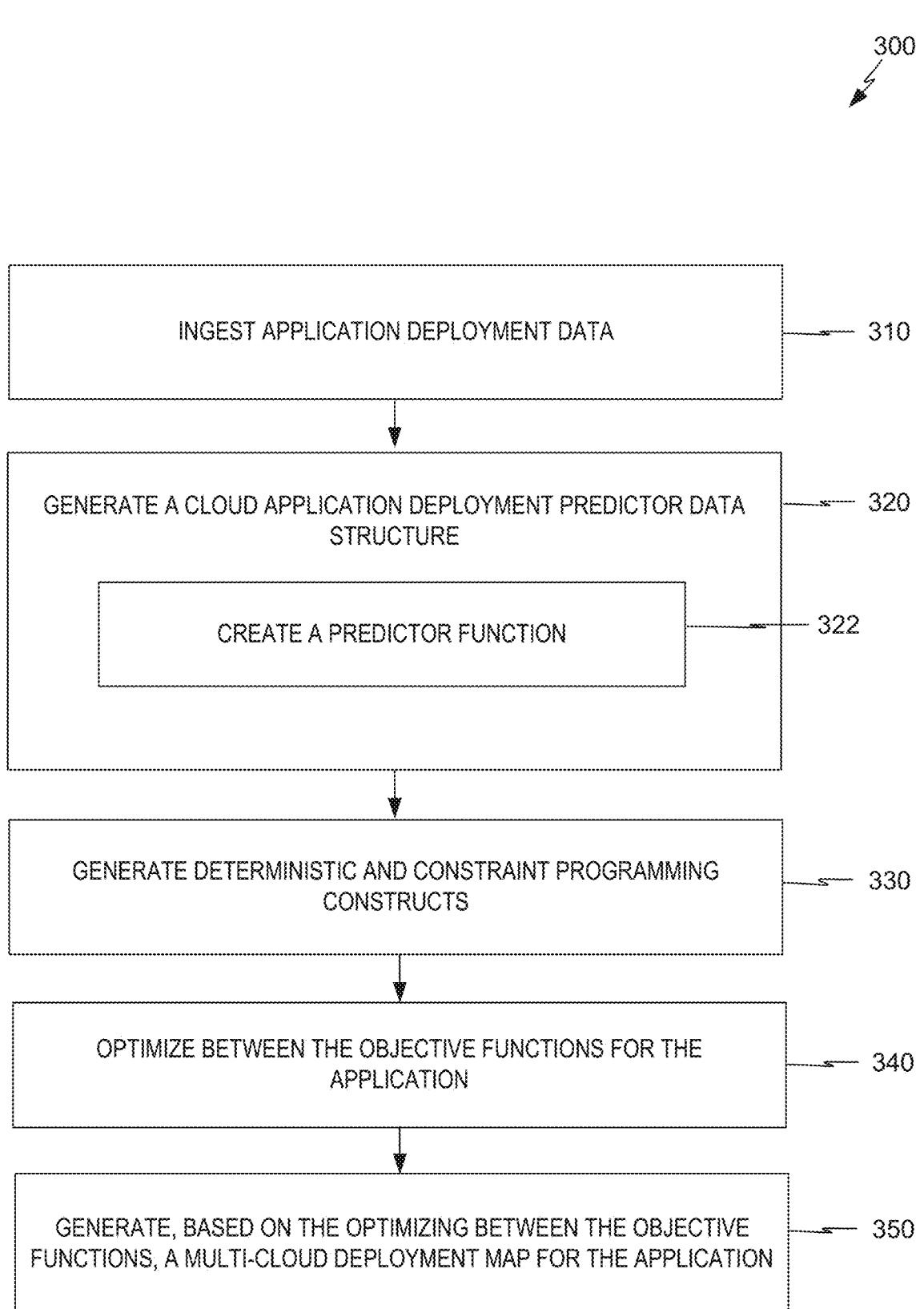

INGEST APPLICATION DEPLOYMENT DATA — 310

GENERATE A CLOUD APPLICATION DEPLOYMENT PREDICTOR DATA STRUCTURE — 320

CREATE A PREDICTOR FUNCTION — 322

GENERATE DETERMINISTIC AND CONSTRAINT PROGRAMMING CONSTRUCTS — 330

OPTIMIZE BETWEEN THE OBJECTIVE FUNCTIONS FOR THE APPLICATION — 340

GENERATE, BASED ON THE OPTIMIZING BETWEEN THE OBJECTIVE FUNCTIONS, A MULTI-CLOUD DEPLOYMENT MAP FOR THE APPLICATION — 350

FIG. 3

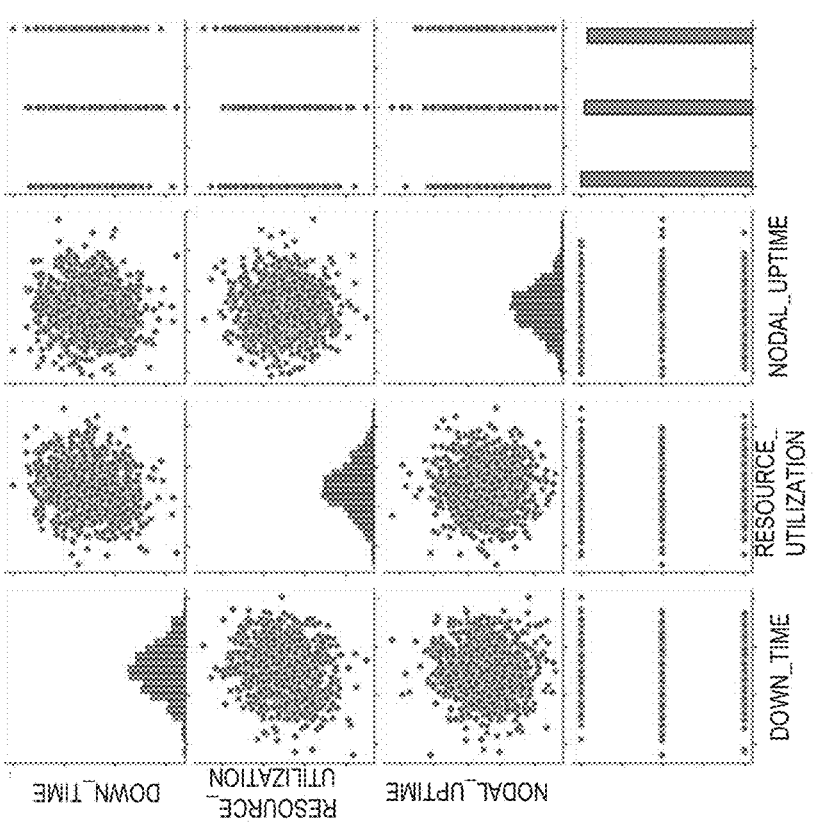
FIG. 6

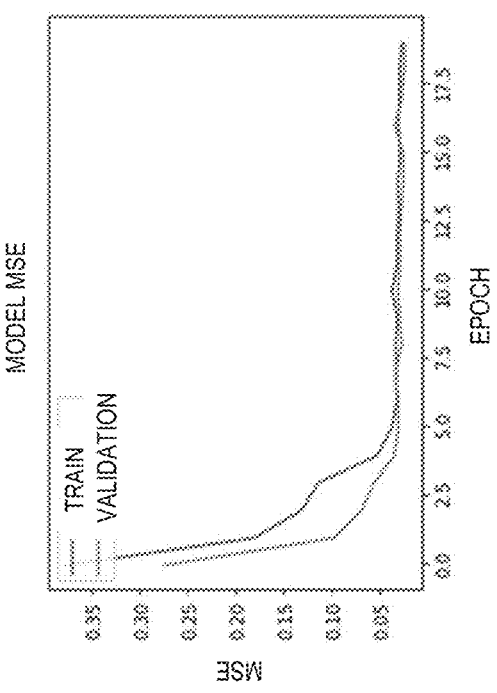
FIG. 7

800

```
Total (root+branch&cut) =    0.02 sec. (0.03 ticks)
* Optimization model has Solution
objective: 540
  ServiceAssignment_D1_C1_140=1
  ServiceAssignment_D3_C2_130=1
  ServiceAssignment_D3_C3_150=1
  ServiceAssignment_D3_C4_120=1
* KPI: Service deployment overall cost = 540.0000
```

900 t[58]:

| | Clouds | Components | ServiceCost | ServerAssignment |
|---|---|---|---|---|
| 0 | D1 | C1 | 140 | 1.0 |
| 1 | D3 | C2 | 130 | 1.0 |
| 2 | D3 | C3 | 150 | 1.0 |
| 3 | D3 | C4 | 120 | 1.0 |

OPTIMIZING COMPONENTS FOR MULTI-CLOUD APPLICATIONS WITH DEEP LEARNING MODELS

BACKGROUND

Aspects of the present invention relate generally to cloud deployment, and more particularly, to deploying applications using multiple cloud systems.

Cloud computing yields great advantages for many software applications, but also imposes substantial complexity. Many options exist for deploying different software elements on any of various cloud systems. Large and complex software applications may have components deployed across multiple cloud systems.

SUMMARY

In a first aspect of the invention, there is a computer-implemented method including: ingesting, by one or more computing devices, application deployment data for an application; generating, by the one or more computing devices, a cloud application deployment predictor data structure for the application; generating, by the one or more computing devices, objective functions for the cloud application deployment predictor data structure for the application; optimizing, by the one or more computing devices, between the objective functions for the application; and generating, by the one or more computing devices, based on the optimizing between the objective functions, a multi-cloud deployment map for the application.

In another aspect of the invention, there is a computer program product including one or more computer readable storage media having program instructions collectively stored on the one or more computer readable storage media. The program instructions are executable to: ingest application deployment data for an application; generate a cloud application deployment predictor data structure for the application; generate objective functions for the cloud application deployment predictor data structure for the application; optimize between the objective functions for the application; and generate, based on the optimizing between the objective functions, a multi-cloud deployment map for the application.

In another aspect of the invention, there is system including a processor, a computer readable memory, one or more computer readable storage media, and program instructions collectively stored on the one or more computer readable storage media. The program instructions are executable to: ingest application deployment data for an application; generate a cloud application deployment predictor data structure for the application; generate objective functions for the cloud application deployment predictor data structure for the application; optimize between the objective functions for the application; and generate, based on the optimizing between the objective functions, a multi-cloud deployment map for the application.

BRIEF DESCRIPTION OF THE DRAWINGS

Aspects of the present invention are described in the detailed description which follows, in reference to the noted plurality of drawings by way of non-limiting examples of exemplary embodiments of the present invention.

FIG. 3 shows a flowchart of an exemplary method in accordance with aspects of the present invention.

FIG. 6 depicts a graph array illustratively depicting sample data for a validation and test run for a target nodal cloud deployment guidance predictor, in accordance with aspects of the present invention.

FIG. 7 illustrates a graph of a mean square error loss for training data and validation data as a machine learning training for a nodal cloud deployment predictor module for a multi-cloud deployment analysis in the example of FIG. 6, in accordance with aspects of the present invention.

DETAILED DESCRIPTION

Figure 1:
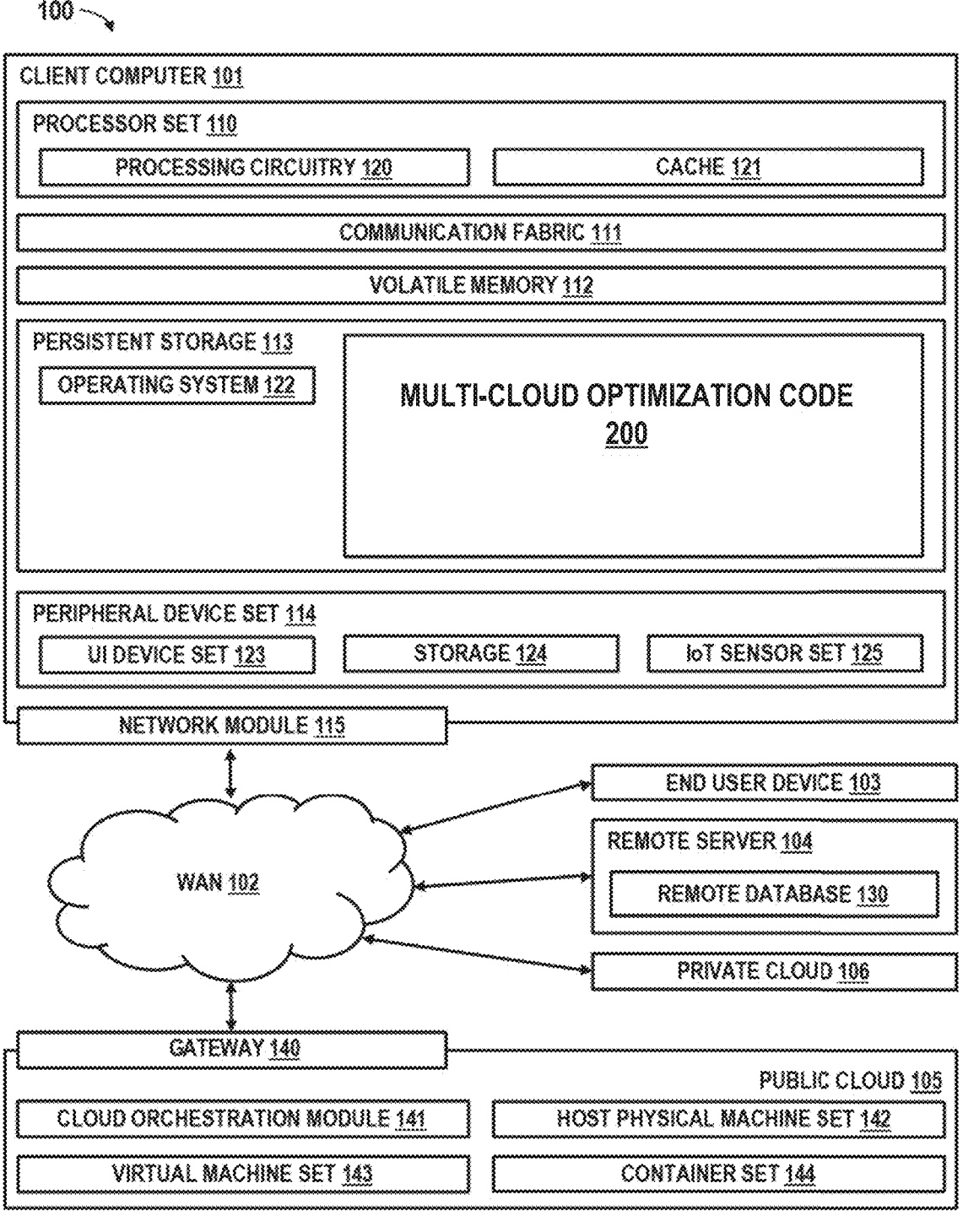
FIG. 1 depicts a computing environment according to an embodiment of the present invention.

Aspects of the present invention relate generally to redeploying cloud applications and, more particularly, to generating mappings of cloud application redeployments among multiple cloud service providers in an optimized manner among several competing objective functions. According to aspects of the invention, a multi-cloud optimization system may optimize cloud application redeployments among multiple cloud service providers, with optimization across several competing objective functions, across cloud applications of arbitrarily high scale and complexity.

Various aspects of this disclosure are directed to systems and methods for multi-cloud optimization, to optimize components for containerized and non-containerized applications on multi-cloud systems, using deep learning models and integer programming. An example method may include performing data ingestion of multi-cloud application data, with regard to applications, platforms, migrations, and service level objective (SLO) attributes. This may include ingesting data from one or more continuous integration/continuous deployment (CI/CD) platforms. This data ingestion may uncover information on past failures, resource uptime, and response time of each application component or application cohort. The application cohorts may, for example, include components, environments, and types, and may be expressed as vector components as [Component, Environment, Type]. In other words, a "cohort" as used herein may illustratively refer to any specific combination of an application and a cloud environment in which the application is to be deployed; for example, an application, an application component, a cloud environment, and a cloud type. The application cohorts may be extended to include further elements. An example system may store such data and analyze the data in support of determining optimized multi-cloud application configurations.

An example method may include creating cognitive deployment vectors using stochastic based predictions, including with neural networks, in some examples. An example system may include a target nodal cloud deployment predictor module. Cognitive deployment vector neural networks may be embedded in the target nodal cloud predictor. The target nodal cloud predictor may create a set of CI/CD and performance-based variables, using a maximum likelihood function or a neural network feedforward network. The cognitive variable vector may comprise vector components for component failure, deployment failure, response time, and component uptime/high availability, and may be formally expressed as: $y''$=[component failure, deployment failure, response time, component uptime/high availability].

An example method may include creating a cloud component objective data structure, such as a cloud component objective matrix, based on a technical and cost matrix, which may be based on a user's or entity's requirements. The cloud component objective matrix may be a linear function, and may be set by a user or entity. Weightings for the cloud component objective matrix may be parametrized based on past experience and historical data for the user's or entity's application.

An example method may include performing an optimization to determine a deployment plan using the cloud component objective matrix. An example system may include a cloud mapping module, or application component cloud mapping decision module, and a set of cognitive variables, which the system may use to identify which application component to deploy in which environment and which cloud, to optimize to selected performance criteria, such as to maximize performance, minimize cost, and/or minimize deployment time. As noted, an application component may be an application cohort, which may include application modules and environments, and may be extended further to include further elements.

An example multi-cloud optimizing method may include generating and outputting optimized patterns for how to deploy an application and its components in various cloud systems. An example multi-cloud optimizing system may generate optimized patterns for how to deploy an application and its components in various cloud systems based on cosine similarity for similar clients with similar digital, cloud, and AI transformations. An example multi-cloud optimizing system may determine such similarity by measuring weights used in objective functions and or deployment vector conditions, in various examples.

Implementations of this disclosure are necessarily rooted in computer technology. For example, steps of generating, by the one or more computing devices, a cloud application deployment predictor data structure for the application, and redeploying, by one or more computing devices, the application among multiple cloud service providers in accordance with the multi-cloud deployment map for the application, are necessarily computer-based and cannot be performed in the human mind. Further aspects of the present disclosure are beyond the capability of mental effort not only in scale and consistency but also technically and categorically, and may enable optimizing cloud application redeployments among multiple cloud service providers among several competing objective functions with both optimization and speed across cloud applications of arbitrarily high scale and complexity in ways definitively beyond the capability of human minds unaided by computers. Further, aspects of this disclosure provide technological improvements and technological solutions to persistent, complex problems and challenges in conventional cloud deployments. For example, aspects of this disclosure may ensure meeting customized sets of performance goals for cloud software application deployments of arbitrarily high size and complexity, including achieving faster and more reliable performance, higher security, avoidance of downtime, and lower cost, in ways that may be categorically beyond the capabilities of conventional systems.

It should be understood that, to the extent implementations of the invention collect, store, or employ personal information provided by, or obtained from, individuals (for example, any personal information that individuals may enter in a multi-cloud application, or that a multi-cloud optimization system may upload and use from historical data of any user's software application operational history for purposes of generating a multi-cloud deployment optimization), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 depicts a computing environment 100 according to an embodiment of the present invention. Computing environment 100 contains an example of an environment for the execution of at least some of the computer code involved in performing the inventive methods, such as multi-cloud optimization code 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IOT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
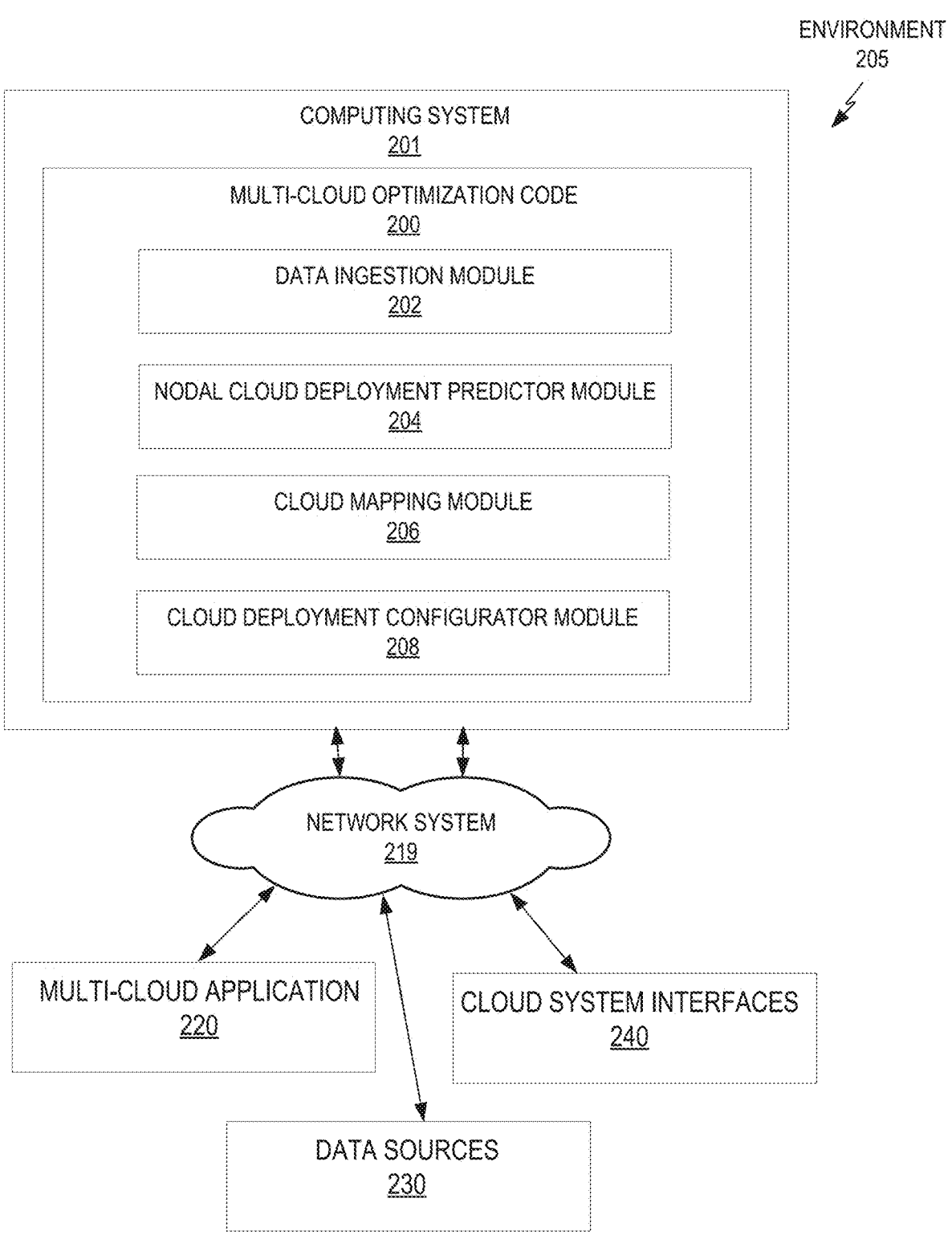
FIG. 2 shows a block diagram of an exemplary environment in accordance with aspects of the present invention.

FIG. 2 shows a block diagram of an exemplary environment 205 in accordance with aspects of the invention. In embodiments, environment 205 includes computing system 201, which implements example multi-cloud optimization code 200 of this disclosure, as introduced above. Computing system 201 may be implemented in a variety of configurations for implementing, storing, running, and/or embodying multi-cloud optimization code 200. Computing system 201 in various examples may comprise a cloud-deployed computing configuration, comprising processing devices, memory devices, and data storage devices dispersed across data centers of a regional or global cloud computing system, with various levels of networking connections, such that any or all of the data, code, and functions of multi-cloud optimization code 200 may be distributed across this cloud computing environment. Multi-cloud optimization code 200 may thus constitute and/or be considered a multi-cloud optimization application or a multi-cloud optimization system, and may comprise and/or be constituted of one or more software systems, a combined hardware and software system, one or more hardware systems, components, or devices, one or more methods or processes, or other forms or embodiments.

In other examples, computing system 201 may comprise a single laptop computer, or a specialized machine learning workstation equipped with one or more graphics processing units (GPUs) and/or other specialized processing elements, or a collection of computers networked together in a local area network (LAN), or one or more server farms or data centers below the level of cloud deployment, or any of a wide variety of computing and processing system configurations, any of which may implement, store, run, and/or embody multi-cloud optimization code 200. Multi-cloud optimization code 200 may interact via network system 219 with any other proximate or network-connected computing systems to analyze a multi-cloud application 220, one or more data sources 230 (e.g., one or more CI/CD systems) on multi-cloud application 220 and historical data on the cloud deployments of its components, and cloud system interfaces 240 that are used for deployments of components of multi-cloud application 220 on multiple cloud systems or services.

In embodiments, computing system 201 of FIG. 2, and any one or more computing devices or components thereof, comprises multi-cloud optimization code 200. In various embodiments, multi-cloud optimization code 200 comprises data ingestion module 202, nodal cloud deployment predictor module 204, cloud mapping module 206, and cloud deployment configurator module 208, each of which may comprise modules of code of block 200 of FIG. 1. These modules of the code of block 200 are executable by the processing circuitry 120 of FIG. 1 to perform the inventive methods as described herein, and as described below. Computing system 201, and any one or more computing devices or components thereof, may include additional or fewer modules than those shown in FIG. 2. In embodiments, separate modules may be integrated into a single module. Additionally, or alternatively, a single module may be implemented as multiple modules. Moreover, the quantity of devices and/or networks in the environment is not limited to what is shown in FIG. 2. In practice, the environment may include additional devices and/or networks; fewer devices and/or networks; different devices and/or networks; or differently arranged devices and/or networks than illustrated in FIG. 2.

There are numerous vendors in the market offering cloud services. Each entity deploying a cloud application has a different set of priorities to be accomplished based on the nature of their business or function. For instance, response time is critical for online banking systems during financial transactions, whereas scalability is very important for retail industry, and security is of huge importance for insurance and financial sectors. However, for some small digital entities deploying cloud applications, the key is to minimize cost of deployment, given that the minimum response time is met. For still other entities deploying cloud applications, application failure rate is of greater sensitivity, and it is a priority to minimize the application failure rate.

A cloud application may typically include multiple technical components to achieve a business goal or other functional goal. Which technical component of the application will fit in which cloud in a hybrid multi-cloud environment is a challenging and daunting task. Some of the key decisions and tasks include deciding the component uptime, deciding the acceptable component deployment failure rate, and deciding the component mapping with optimized cloud options.

Determining component uptimes may conventionally include taking into consideration various parameters. There is conventionally minimal method and system in place to predict the component uptime of the application in different clouds based on user-specific cloud parameters.

Determining acceptable component deployment failure rates may conventionally include taking into consideration various parameters. There is conventionally minimal method and system in place to predict the component deployment failure of the application in different clouds based on the client specific cloud parameters.

Determining component mappings with optimized cloud service options may conventionally include taking into consideration various parameters. There is conventionally minimal method and system in place to map components to optimized cloud options based on their characteristics on the basis of cost, deployment failure, uptime, and unique combinations given as per key performance indicators (KPIs). Considering the involved complexities in predicting the critical outcome of cloud deployments, it is advantageous for both cloud application deploying entities and cloud service providers to have adequate information and forecast vision on what is going to be hosted.

Systems and methods of the present disclosure may address and resolve the problems listed above, and predict application uptime, application deployment failures, and application component mapping, among other inventive advantages. Systems and methods of the present disclosure may be advantageous for both cloud application deploying entities and cloud service providers. Systems and methods of the present disclosure may provide a framework for developing and deploying both new, green field cloud applications and existing cloud applications. Systems and methods of the present disclosure may also help cloud application deploying entities make advantageous decisions before deploying any application component to the cloud and for migrating any application component from one cloud service or environment to another cloud service or environment. Systems and methods of the present disclosure may also enable faster cloud deployment along with other cloud deployment optimizations.

Multi-cloud optimization code 200 may comprise a data ingestion module 202 configured for ingesting any relevant application deployment data and/or other application data, such as historical data of users' software application operational history. This may include ingesting a history of data from CI/CD systems, version control systems, usage log data stores, and any other sources of relevant data, in various examples.

Multi-cloud optimization code 200 may comprise a nodal cloud deployment predictor module 204 that generates a cloud application deployment predictor data structure, such as a nodal cloud application deployment predictor vector, matrix, or tensor, in various examples. The nodal deployment predictor vector may predict each project, application, or cloud cohort with a deployment vector comprising any of various performance criteria as vector components, such as application failure rate, deployment failure rate, security bugs, and response time, such as in the following:

$$\vec{y} = \begin{pmatrix} \text{Application Failure} \\ \text{Deployment Failure} \\ \text{Security Bug} \\ \text{Response Time} \end{pmatrix}$$

Such a nodal deployment predictor vector may also be represented in row vector form, such as in the following:

$$\vec{y} = [y_1, y_2, y_3, y_4]$$

In order to make predictions, nodal cloud deployment predictor module 204 may generate target nodal cloud deployment predictor vectors to predict each vector dimension separately. The vector components may be based on observational data, where each observation may belong to a unique cohort comprising a different project, application, or cloud service.

Multi-cloud optimization code 200 may comprise a cloud mapping module 206 for target component cloud mapping. Cloud mapping module 206 may generate objective functions for the cloud application deployment predictor data structure, and may optimize between objective functions. Cloud mapping module 206 may use deterministic integer programming and/or mixed integer programming to make determinations to optimize one or more objective functions, which cloud mapping module 206 may decompose to different competing objective functions. These competing objective functions may be modified and customized for a particular cloud application deploying user. These competing objective functions may include cost, deployment failure rate, response time, and/or other factors, and and/or combinations of the above, as may be identified in criteria such as KPIs, in various examples.

Multi-cloud optimization code 200 may further include a cloud deployment configurator module 208. Cloud deployment configurator module 208 may create, compare, apply, and use objective functions for applications or projects for cloud deployment based at least in part on comparisons with similar past applications or projects, including by other users (consistent with protecting data), and output the optimized objective functions to cloud mapping module 206. Cloud mapping module 206 may then generate and output, based on the optimizing between the objective functions, a designated multi-cloud application deployment map, in accordance with various examples of this disclosure.

Multi-cloud optimization code 200 in aspects of this disclosure aligns with hybrid cloud and multi-cloud strategies and needs for many legacy systems which need to be migrated to hybrid cloud and multi-cloud environments, in some illustrative examples. Multi-cloud optimization code 200 in aspects of this disclosure may play a pivotal role in migration of workloads to hybrid cloud and multi-cloud environments, in some illustrative examples. Multi-cloud optimization code 200 in aspects of this disclosure may also use cloud processing in aspects such as for performing machine learning probabilistic optimization for optimizing the weights for neural network neurons, in some illustrative examples.

FIG. 3 shows a flowchart of an exemplary method 300 in accordance with aspects of the present invention. Steps of method 300 may be carried out in the environment of FIG. 2 and are described with reference to elements depicted in FIG. 2. Multi-cloud optimization code 200 may use a process flow and one or more models as follows, in various examples.

In embodiments, and as described with respect to FIG. 2, as well as in the subsequent figures as described below, in step 310, multi-cloud optimization code 200 may perform application deployment data ingestion. Data ingestion module 202 of multi-cloud optimization code 200 may perform data ingestion, which may include fetching, receiving, and ingesting any data relevant to deployment of a subject application. Data ingestion module 202 may classify data in accordance with categories of attributes, such as application attributes, platform attributes, migration attributes, and service level objective (SLO) attributes. Data ingestion module 202 may thus function as both a data receiving module and a data classifying or categorizing module.

In step 320, multi-cloud optimization code 200 may generate a cloud application deployment predictor data structure for the application and perform stochastic-based prediction. Nodal cloud predictor module 204 of multi-cloud optimization code 200 may generate the cloud application deployment predictor data structure for the application and perform the stochastic based prediction. As part of step 320 in various examples, nodal cloud predictor module 204 may perform machine learning analysis and machine learning training using one or more neural networks and using the historical application deployment data as machine learning training data to generate predictions for future application deployment performance attributes across all potential application deployment options and scenarios within the potential predictive scope of the existing application deployment data, in various examples. The potential predictive scope of the existing application deployment data as used as training data for machine learning training may extend to many scenarios that never occurred in the historical data but that the machine learning process is capable of extrapolating to, in various examples. As part of step 320 in various examples, nodal cloud predictor module 204 may perform step 322 of creating a predictor function, such as a maximum likelihood function or a neural network feedforward network, to create a cloud application deployment predictor data structure, such as in the form of a vector set of target variables y=[component failure, deployment failure, response time, component uptime/high availability] in various examples. As part of step 320 in various examples, nodal cloud predictor module 204 may create a cloud component objective data structure such as a cloud component objective matrix, as described as follows.

In step 330, multi-cloud optimization code 200 may generate deterministic and constraint programming constructs, and perform deterministic optimization engineering based on a constraint data structure such as a constraint vector or constraint matrix and a cloud component objective matrix, as further described below. Multi-cloud optimization code 200 may thus generate objective functions for the cloud application deployment predictor data structure for the application. Cloud mapping module 206 of multi-cloud optimization code 200, which may be a component cloud mapping decision module, may perform deterministic optimization engineering, in various examples. As part of step 330 in various examples, nodal cloud predictor module 204 may create a cloud component objective data structure such as a cloud component objective matrix. Multi-cloud optimization code 200 may create a predictor function, as in step 322, and use that predictor function as an objective function for a given cohort.

In steps 340 and 350, multi-cloud optimization code 200 may optimize between the objective functions for the application, as further described below, and generate, based on the optimizing between the objective functions, a multi-cloud deployment map for the application, as further described below, and thereby output recommended optimized patterns for deploying an application and its components across various cloud services, as further described below. Cloud deployment configurator module 208 of multi-cloud optimization code 200 may perform the outputting of recommended optimized patterns for deploying an application and its components across various cloud services, in various examples.

Figures 4A, 4B:
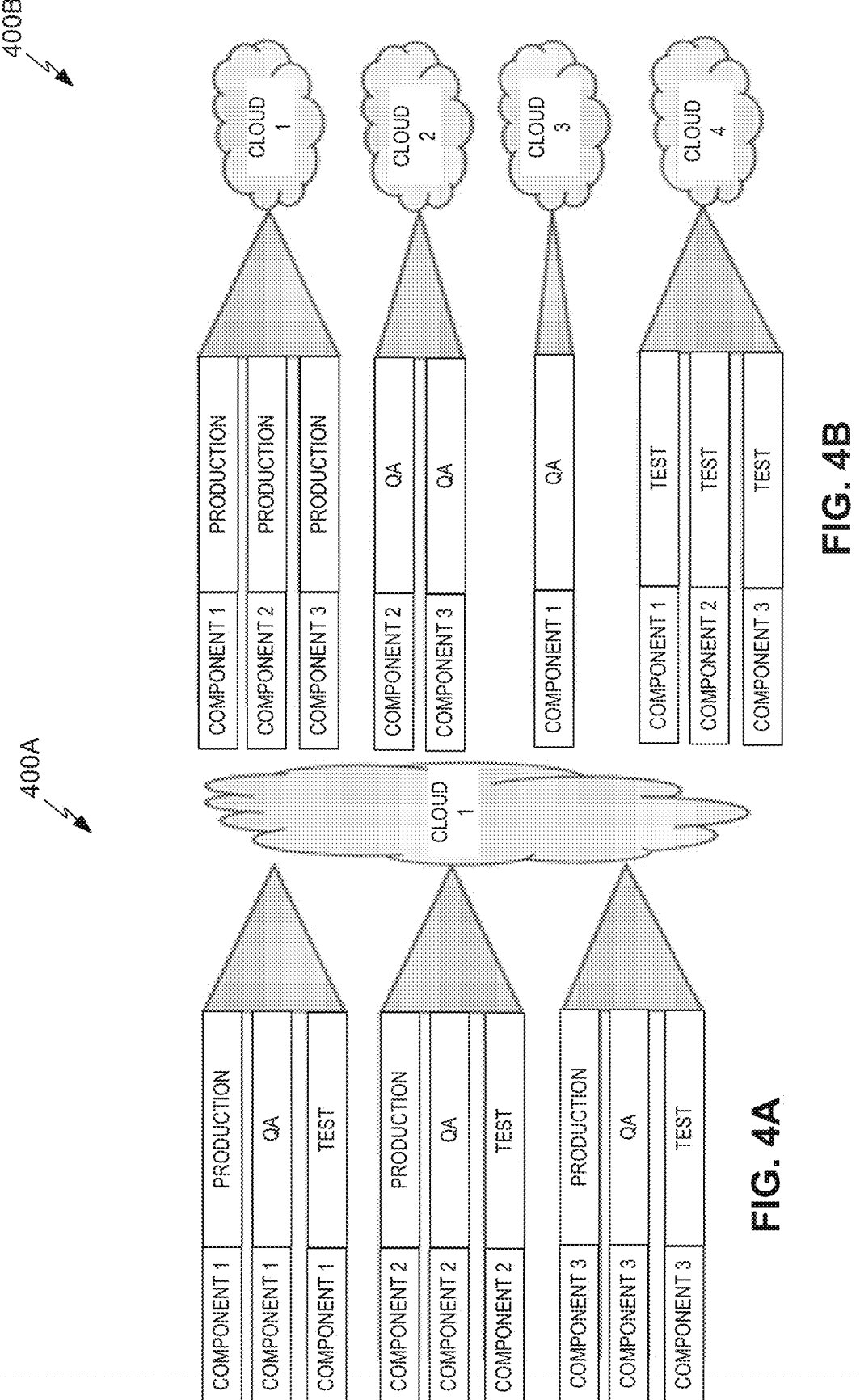
FIG. 4A illustrates an example conventional cloud application deployment, as a basis of comparison, prior to analysis, processing, and multi-cloud redeployment in accordance with aspects of the present invention.
FIG. 4B illustrates a multi-cloud redeployment of the same cloud application in accordance with a designated multi-cloud deployment map generated by a multi-cloud optimization code for the application, based on optimizing between objective functions, in accordance with aspects of the present invention.

FIG. 4A illustrates an example conventional cloud application deployment 400A, as a basis of comparison, prior to analysis, processing, and multi-cloud redeployment in accordance with aspects of this disclosure. FIG. 4B illustrates a multi-cloud redeployment 400B of the same cloud application in accordance with a designated multi-cloud deployment map generated by multi-cloud optimization code 200 for the application, based on optimizing between objective functions, in accordance with aspects of this disclosure.

FIG. 4A illustratively depicts deployment 400A with three application components deployed to a single cloud service, "Cloud 1," including separate production, testing, and quality assurance (QA) versions or environments of each of the three components, thus yielding nine total separate deployment environments. Among the inventive insights of this disclosure, this deployment has a number of disadvantages. The same high-performance level of response time is provided, and incurring high cost accordingly, for all of the environments, which is not required. The same costs are being incurred for the test and QA environments of each component, with lower performance requirements, as for the production environments of each component. Deployment failures may likely be volatile.

FIG. 4B illustratively depicts multi-cloud deployment 400B with the same nine deployment environments of the application redeployed in accordance with the multi-cloud deployment map generated by multi-cloud optimization code 200. Multi-cloud deployment 400B includes all three component production environments deployed to the same high service level agreement (SLA) cloud service, "Cloud 1," as in deployment 400A in FIG. 4A, while all of the test and QA environments have been redeployed elsewhere. The QA environments are redeployed across two different cloud service providers, "Cloud 2" and "Cloud 3," while the test environments are all redeployed to yet another cloud service provider, "Cloud 4," a portfolio of deployments that multi-cloud optimization code 200 has determined and optimized based on the optimizing between the objective functions, as the culmination of the data ingestion, analyzing, machine learning training and prediction, and optimizing functions in aspects as described herein.

Returning to the data ingestion, an application may be or include a self-contained software component or set of components, which may provide specific functionalities to end users and/or to another one or more applications, in various examples. Multi-cloud optimization code 200, such as data ingestion module 202 thereof, may analyze and decompose an application to determine all of its constituent elements, which multi-cloud optimization code 200 may categorize, such as in terms of projects, components, and functionalities, for example.

Data ingestion module 202 and/or nodal cloud deployment predictor module 204 may, as part of analyzing and decomposing the application to determine all of its constituent elements, represent and encode the application in a matrix, vector, tensor, or other data structure, such as with individual matrix elements that may potentially include intersections of all projects, components, and functionalities, from 1 through n, 1 through m, and 1 through k, respectively. A "data structure" as used herein may refer to a matrix, a vector, a tensor, a scalar, or any other kind of data structure. Multi-cloud optimization code 200 may thus represent and encode the application in a matrix [Project, Component, Functionality] with n×m×k elements, that illustratively include: Project 1, Component 1, Functionality 1; Project 1, Component 1, Functionality 2; . . . Project 1, Component 1, Functionality n; Project 1, Component 2, Functionality 1; Project 1, Component 2, Functionality 1; . . . Project 1, Component m, Functionality 1; Project 1, Component 1, Functionality 1; Project 2, Component 1, Functionality 1; . . . Project k, Component 1, Functionality 1; . . . Project n, Component m, Functionality k. Thus, multi-cloud optimization code 200 may encode every application component as a unique cohort vector which multi-cloud optimization code 200 may designate for deployment to a unique cloud service. Multi-cloud optimization code 200 may use these unique application component combinations as parts of machine learning training data.

Multi-cloud optimization code 200, e.g., data ingestion module 202 and/or nodal cloud deployment predictor module 204 thereof, may analyze and generate cloud application attributes. Data ingestion module 202 and/or nodal cloud deployment predictor module 204 may analyze and generate cloud application attributes illustratively such as: downtime of a cloud service; resource utilization of an application component in a cloud service; resource uptime of a cloud service node; resource cost of a cloud service resource; and security vulnerability fix rate of a cloud service, as examples.

Multi-cloud optimization code 200, e.g., data ingestion module 202 and/or nodal cloud deployment predictor module 204 thereof, may analyze and generate cloud platform attributes. Data ingestion module 202 and/or nodal cloud deployment predictor module 204 may analyze and generate platform attributes illustratively such as: cloud platform resource uptime commitment; cloud platform resource cost; cloud platform security vulnerability fix rate; cloud platform provision time; cloud platform support time; and cloud platform migration cost, as examples.

Multi-cloud optimization code 200, e.g., data ingestion module 202 and/or nodal cloud deployment predictor module 204 thereof, may generate a constraints data structure such as a constraints vector b. Data ingestion module 202 and/or nodal cloud deployment predictor module 204 may generate the constraints vector illustratively to include vector components such as: source cloud features and dependencies (e.g., versions, compatibility, virtual machines (VMs) versus servers, serverless, observability); source cloud lock-in; destination cloud features and dependencies (again, now in the destination cloud context, e.g., versions, compatibility, virtual machines (VMs) versus servers, serverless, observability); and destination cloud lock-in. Multi-cloud optimization code 200 may use the constraints vector b in performing deterministic optimization engineering based on constraints vector b and the cloud component objective matrix, as described above with reference to step 330 in FIG. 3, in various examples.

Multi-cloud optimization code 200, e.g., data ingestion module 202 and/or nodal cloud deployment predictor module 204 thereof, may further generate a data and environment type data structure. Data ingestion module 202 and/or nodal cloud deployment predictor module 204 may generate the data and environment type data structure to include elements such as application environments, categorized between application environments such as customer-facing or other user-facing production environments, and private software engineering environments, such as software development environments, software testing environments, and software quality assurance (QA) environments, as examples, and as shown in FIGS. 4A and 4B and described with reference thereto. Data ingestion module 202 and/or nodal cloud deployment predictor module 204 may further generate the data and environment type data structure, based on the historical and/or ongoing data, to include elements such as frequency of accessing the application components; data sensitivity categories, e.g., legally restricted data, other personal sensitive data, and public data, with different categories of accordingly applicable data protection and/or encryption, with restricted and sensitive data to be hosted in the secure resources (e.g., including private cloud and/or on-premise cloud), and allowing public data in public cloud services; and data duration categories, such as permanent data versus transaction data which does not need to be retained permanently, as examples.

Multi-cloud optimization code 200 may thus optimize between objective functions. This optimizing between the objective functions by multi-cloud optimization code 200 may include performing deterministic optimization based on the cloud deployment constraints data structure and on a cloud application component objective matrix, as in step 330 as described with reference to FIG. 3, where the cloud application component objective matrix may be based on the objective functions. The performing the deterministic optimization by multi-cloud optimization code 200 may further be based on a data and environment type data structure.

Based on the optimizing between the objective functions, and based on all of the processing described above in various examples, multi-cloud optimization code 200 may generate and output a designated multi-cloud deployment map for the application, e.g., a recommendation hybrid cloud and multi-cloud application deployment map, as in steps 340 and 350 of FIG. 3, as described above. The generated multi-cloud application deployment map may comprise hybrid cloud and multi-cloud distributions of applicable workloads for the subject application. Multi-cloud optimization code 200 may be configured to automatically implement the resulting multi-cloud deployment of the application, or to generate the designated multi-cloud deployment map for the application in any of various forms for review by a user or entity, and may facilitate the user or entity approving or first modifying the designated multi-cloud deployment map and then implementing the multi-cloud deployment based on the generated recommendation designated multi-cloud deployment map, in various examples.

In various examples, the designated multi-cloud deployment map generated by multi-cloud optimization code 200 may designate highly secure workloads to be hosted in private, on-premise cloud systems and/or high-assurance encrypted cloud systems, whereas multi-cloud optimization code 200 may designate non-sensitive informational library kinds of workload to be hosted in public cloud services. For data that is highly critical, multi-cloud optimization code 200 may designate saving replications of the data across multiple, redundant cloud systems, services, and/or geographic regions, so that even if one cloud system or service is down, the data is available in another cloud. In another instance, multi-cloud optimization code 200 may designate saving some data in one cloud service and another part of the data in another cloud service, so that the join needs to happen among two clouds services, and co-ownership needs to be established between two cloud services.

Which component multi-cloud optimization code 200 may designate to be deployed in which cloud service may depend on various parameters. For example, multi-cloud optimization code 200 may base an optimized deployment mapping at least in part on a cloud environment, e.g., high SLA and high availability for production components, and medium SLA and medium availability, if and when acceptable, for non-production components such as development, test, and QA.

As another example, multi-cloud optimization code 200 may base an optimized deployment mapping at least in part on frequency of accessing the components. For components for which access is frequent, multi-cloud optimization code 200 may designate deploying in cloud services offering high SLA. For components for which access is occasional, non-urgent, and non-critical, multi-cloud optimization code 200 may designate such components to be deployed in low SLA cloud services.

As another example, multi-cloud optimization code 200 may base an optimized deployment mapping at least in part on response times. For components configured for processing transactions in realtime, multi-cloud optimization code 200 may designate deploying the components in cloud services offering high quality assurance rapid response time. For components configured for processing transactions asynchronously, multi-cloud optimization code 200 may designate deploying the components in cloud services offering medium response times.

As another example, multi-cloud optimization code 200 may base an optimized deployment mapping at least in part on data sensitivity levels. For data with legal restrictions or classifications or other personally sensitive data, multi-cloud optimization code 200 may designate deploying the data components in cloud services offering high QA encryption, or in private or on-premise cloud systems. For publicly available data, multi-cloud optimization code 200 may designate deploying the data components in public cloud services or cloud services without data protection or encryption assurance.

As another example, multi-cloud optimization code 200 may base an optimized deployment mapping at least in part on data duration category. Multi-cloud optimization code 200 may designate deploying the data components in cloud services providing assured permanent storage where needed, and without permanent storage for transaction data and/or where applicable.

Returning to stochastic predictions, in an illustrative example, multi-cloud optimization code 200 may generate a cloud application deployment predictor data structure for the application, as in step 320 in FIG. 3 as discussed above, by encoding an attribute data structure X for attributes such as application attributes, vector attributes, platform attributes, migration data attributes, and transaction data attributes, in the following example. Attribute data structure X encoded by multi-cloud optimization code 200 may illustratively include the following application attributes:

$x_1$ Cloud Vendor Type for Project 1

$x_2$ Environment Type for Project 1

$x_3$ Database component t{SQL, No-SQL}

$x_4$ Integration Component{Number of Inbound, Outbound Services}

$x_5$ ETL Component{Present, Absent}

$x_6$ Service Specification{Swagger, HTTP, Open API, Rest API}

$x_7$ Content Management {Optim, AEM}

$x_8$ Event Processing System $x_9$ Cache Management $x_{10}$ Security Validation Attribute data structure X encoded by multi-cloud optimization code 200 may illustratively include the following platform attributes:

$x_{10}$ Resource Utilization $x_{11}$ Resource Uptime $x_{12}$ Resource Cost $x_{13}$ Security Vulnerability Fix Rates Attribute data structure X encoded by multi-cloud optimization code 200 may illustratively include the following data attributes:

$x_{10}$ Environment Type $x_{11}$ Type of Data $x_{12}$ Resource Cost

For each vector set of target variables $y_i$, as described above with reference to nodal cloud predictor module 204 performing step 320 in FIG. 3, multi-cloud optimization code 200 may create a function $f_i$ of attribute data structure X such that:

$$f_i : R^n - \to R$$

$$y_i = f(\vec{x});$$

$$y_1 = \frac{\text{DEPLOYMENT Failure}}{\text{Week}}$$

$$\vec{x_1} = [x_{11}, x_{21}, x_{31} \ldots \ldots ]$$

X may be a set of all observation/measurement vectors of different deployments=$\{(\vec{x_1}, \vec{x_2} \ldots \vec{x_n})\}$ Let $$\vec{y} = [y_1, y_2, y_3, y_4] \text{ where } \vec{y} \text{ is vector} = \begin{bmatrix} y_1 \\ y_2 \\ y_3 \end{bmatrix}$$

where $y_1$ represents deployment failure, $y_2$=Response Time, $y_3$=Application Failure, $y_4$=security bug rate.

Let $X \in {}^{n \times m}$ matrix where n is the number of instances of unique cohorts and m is the number of deployment features.

$$p(y_i \mid \vec{x_i}, \theta) = N(y \mid f(\vec{x_i}), \sigma^2)$$

$$=> \vec{x} \in R^d, \ y \in R \text{ and } y = f(x) + \varepsilon \text{ where } \varepsilon = N(0, \sigma^2)$$

$p(y_n|X,\theta)=N(y|X,\theta,\sigma^2)$ where X is vector of Random Variables $p(y_q|\vec{x_n})$ is the likelihood of probability density function of y at $x^T$ and hence $y=x_n{}^T \theta=\varepsilon$.

Now if $$Y = \{y_1, y_2, y_3 \ldots y_N\} \ \& \ X = \vec{x_1}, \vec{x_2}, \vec{x_n}$$

$$p(Y|X, \theta) = p(y_1|\vec{x}) * p(y_2|\vec{x_2}) * p(y_n|\vec{x_n}) = \prod_{i=1}^{n} p\left(y_i | \overline{p(x_i)}\right)$$

Taking the logarithm of both sides:

$$-\log P(y|_1 X, \theta) \ldots = -\log \prod_{n=1}^{N} P(y_n|x_n \theta)$$

$$\Rightarrow -\log P(y|X, \theta) = -\sum_{n}^{N} \log P(y_n|x_n, \theta)$$

$$\Rightarrow L(\theta) = -\log P(y|X, \theta) = -\log \left( \frac{1}{\sqrt{2\pi\sigma^2}} * e^{\left(\frac{(y-x^T\theta)^2}{2*\sigma^2}\right)} \right)$$

$$\Rightarrow L(\theta) = -\frac{1}{2\sigma^2}\left(y_n - x_n^T\theta\right)^2 + \sum_{n=1}^{N} \log\left(1/\left(\sqrt{2*\pi\sigma^2}\right)\right).$$

Multi-cloud optimization code 200 may then minimize $L(\theta)$ using a gradient descent algorithm, represented in pseudocode as follows:

Given a vector $$\vec{\theta} = \begin{bmatrix} \theta_1 \\ \theta_k \end{bmatrix}$$

representing a parametric vector;

Set Iteration=0 and put initial parameters for learning rate ($\eta$) and Epsilon Calculate $\nabla L(\vec{\theta})$ which is gradient vector While $\nabla L(\vec{\theta})$>Epsilon:

$$\vec{\theta_{N+1}} = \vec{\theta}_N - \eta \sum_{i=.1}^{N} \left\{ \nabla L(\vec{\theta})^T \right\}$$

where N refers to training measurements over X, Y $$N = N + 1$$

end While

Return $\vec{\theta}$ {Optimized value with k components}

Thus, $f: R^n -> R y_{ij} = X_i^T \vec{\theta}$ where i is the observation and j is the component for which prediction happens. Thus:

$$\tilde{y_{n2}} = x_n^T \vec{\theta}$$

where $\tilde{y_{n2}}$ represents predicted downtime failure for n the application, and 2 represents downtime failure, and $\tilde{y_{n1}}$ represents predicted application failure.

Multi-cloud optimization code 200 may use a feedforward neural network also to detect deployment failure and application failure independently. Multi-cloud optimization code 200 may therefore create vectors of functions to predict deployment failure, application failures, security bug fixes, and response times for different permutations of key value pairs of projects, components, and different cloud service providers.

Multi-cloud optimization code 200 may also perform optimization using integer programming. Illustratively, cloud mapping module 206 of multi-cloud optimization code 200 may perform optimization using integer programming, as part of cloud component module mapping, and using a constraint data structure such as a constraint matrix and a cloud component objective data structure such as a cloud component objective matrix, as described above as part of step 330 in FIG. 3, in accordance with the following illustrative example.

Let A be m*n, a matrix which is a total unimodular matrix in $R^{(M*N)}$, and m is number of constraints and n is the number of variables.

Let $\vec{b} \in R^{TM}$ represent constraints from ingestion data, and $\vec{y} \in R^n$ become the optimizing variable (cost, response time, Application Failure Rate) to be minimized. Multi-cloud optimization code 200 has three objective functions in this example. The polytope area is formed, and $p \in R^n | A \cdot \vec{p} \le \vec{b}$.

As noted above, cloud mapping module 206 may generate objective functions for the cloud application deployment predictor data structure, and may optimize between objective functions. One example objective function that cloud mapping module 206 may generate may be the desired performance objective of lowest deployment failure for a given project, which cloud mapping module 206 may determine by:

$$\text{Min } Z = \sum_{i=1}^{k} \sum_{j=1}^{m} y_{ij} * p_{i,j} \text{ S.T.}$$

$$A * \vec{p_l} = \vec{b}$$

Another example objective function that cloud mapping module 206 may generate may be minimized migration cost. Cloud mapping module 206 may generate this minimized migration cost objective function in a scalar form, in which c is the cost of project application component i in cloud j, and p is decision variable which can be 0 or 1, where p=1 if component i is migrated to a new cloud service k, and p=0 if component i remains deployed on its cloud service and is not migrated to a new cloud service.

$$\text{Min } Z = \sum_{i=1}^{k} \sum_{j=1}^{m} c_{ij} * p_{i,j} \Big| A * \vec{p_l} = \vec{b}$$

In an illustrative example, application microservice component p of application cohort j denoting {Project, Application, Cloud Service}, and represented as cohort component $p_j$, is used very frequently, on nearly 85% of service calls. Multi-cloud optimization code 200 may generate a designated multi-cloud deployment map that includes a mapping to deploy cohort component $p_j$ to a high availability SLA cloud service ("cloud 1"). Other application microservice components need to access a third party service component on nearly 5% of service calls. The designated multi-cloud deployment map generated by multi-cloud optimization code 200 may also include a mapping to deploy these microservice components making 5% calls in a relatively less high availability SLA cloud service ("cloud 2"). Multi-cloud optimization code 200 may thereby optimize between the objective functions for the application, and generate, based on the optimizing between the objective functions, a multi-cloud deployment map for the application, as in steps 340 and 350 of FIG. 3, as described above.

The designated multi-cloud deployment map generated by multi-cloud optimization code 200 may also include a mapping to deploy workload components which are coupled and frequently accessed in the same high availability SLA cloud service ("cloud 1"). The designated multi-cloud deployment map generated by multi-cloud optimization code 200 may also include a mapping to deploy workload components which are loosely coupled and with fewer dependencies to the same relatively less high availability SLA cloud service ("cloud 2").

Figure 5:
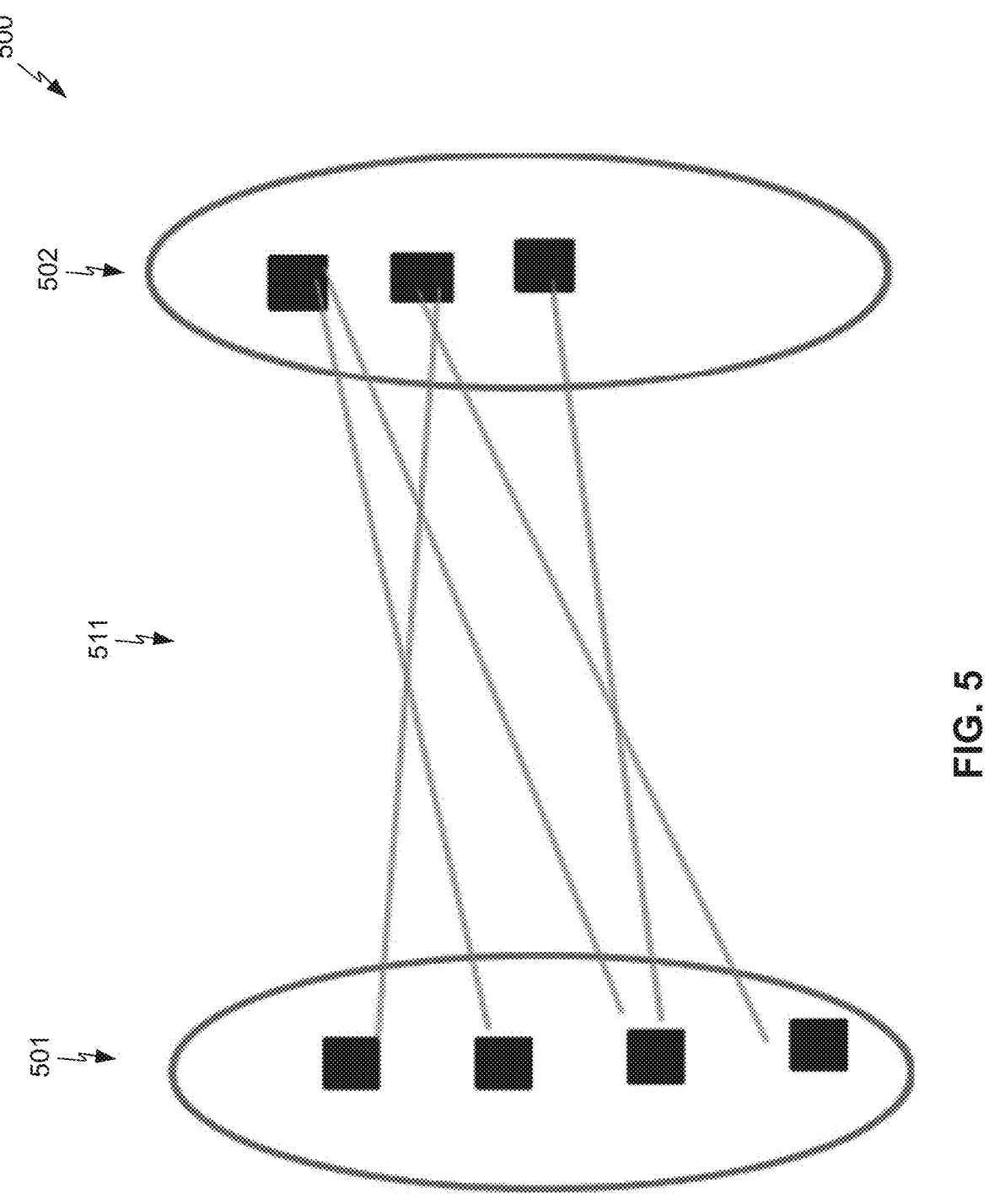
FIG. 5 illustrates a bipartite graph of deployments of application components, including project application components, to cloud service providers, that a multi-cloud optimization code may create in the formulation of deployment mapping based on optimizing among objective functions, in accordance with aspects of the present invention.

FIG. 5 illustrates a bipartite graph 500 of deployments 511 of application components 501, including project application components, to cloud service providers 502, that multi-cloud optimization code 200 may create in the formulation of deployment mapping based on optimizing among objective functions, as described above, in accordance with aspects of the present disclosure. Bipartite graph 500 takes the form G(V, E) where E represents the stochastic values determined coming from $y_i$ [predicted deployment failure, predicted response time, other features] and V represents each of a number of vertexes, where each vertex represents the combination of project and application type. Each edge represents a cost of failure $y_{ij}$. Each business application [i] needs to be deployed to a cloud service [j]. This incorporates the assumption that the same single application component is not to be deployed to multiple cloud services. This yields:

$$\sum_{j=1}^{j=k} p_{i,j} = 1 \qquad \text{eq(1)}$$

$\nabla$ given component i.

The sum of response times of all the components of an application together is less than t seconds:

$$\sum_{i=1}^{i=n} p_{i,j} \le t \qquad \text{eq(2)}$$

i.e $\nabla$ given cloud k

Each cloud service can host at least one business application or other functional application, in case of hybrid cloud.

$$\sum_{i=1}^{i=n} p_{i,j} >= 1 \qquad \text{eq(2)}$$

Multi-cloud optimization code 200 may create constraints around migration costs and operational costs, given the above constraints.

Each application component may thus become part of bipartite graph 500 and the total costs of deployment and potential application failure become costs linked to cloud services. Multi-cloud optimization code 200 may select the best match of each component to an available cloud service, given the total deployment vector multi-cloud optimization code 200 determines, based on optimizing the applicable objective functions, of migration cost and potential deployment failures, to make a determination of what component 501 should be deployed 511 to what cloud service 502, thereby achieving steps 340 and 350 of FIG. 3, as described above.

Multi-cloud optimization code 200 may generate a multi-cloud deployment mapping for new application projects, which may be or comprise any kind of software application or application component, in various examples. When a user or entity is constructing a new project, multi-cloud optimization code 200 may create a construct to create a cosine similarity between projects in a spherical space $\vec{y}$ for new application project multi-cloud optimization code 200 may determine cosine similarities for new application projects to see the difference in an entire nodal deployment vector for a new set of applications. Multi-cloud optimization code 200 may configure objective functions for new users, new entities, or new projects based on performance criteria (e.g., KPIs) of past projects.

FIG. 6 depicts a graph array 600 illustratively depicting sample data for a validation and test run for a target nodal cloud deployment guidance predictor, as an example of nodal cloud deployment predictor module 204, and as described above with reference to generating a cloud application deployment predictor data structure as in step 320 of FIG. 3, in accordance with aspects of the present disclosure. Graph array 600 illustrates an example of nodal cloud deployment predictor module 204 generating predictions for future application deployment performance attributes for potential application deployment options. Nodal cloud deployment predictor module 204 may generate a target nodal deployment vector $y_1$ that predicts cloud deployment performance characteristics in four different dimensions, in this example: nodal uptime, downtime, resource utilization, and deployment failure rate, for various cloud service providers. In this case, data for one of the dimensions, deployment failure rate, is simulated. The data for graph array 600 is based on machine learning processing using a stochastic gradient model based on three layered neurons with an input size of three in a first neural network layer, expanding to eight neurons in a second neural network layer, and four neurons in a third neural network layer. FIG. 6 is intended to convey primarily the conceptual features of the functioning performed by nodal cloud deployment predictor module 204, while the particular data being represented in FIG. 6 is not intended to be of primary importance.

The deployment failure mode (as part of deployment vector $y_1$) was simulated as follows:

| Model: "sequential" | | |
| --- | --- | --- |
| Layer (type) | Output Shape | Param # |
| dense (Dense) | (None, 10) | 50 |
| dense_1 (Dense) | (None, 1) | 11 |

Total params: 61
Trainable params: 61
Non-trainable params: 0

FIG. 7 illustrates a graph 700 of the mean square error loss/L2 loss $L(\theta)$ for training data and validation data as the machine learning training for nodal cloud deployment predictor module 204 for a multi-cloud deployment analysis in the example of FIG. 6 iterated through epochs, on test data that included 100 measurement vectors, in accordance with aspects of the present disclosure. As FIG. 7 shows, the model mean standard error (MSE) decreases rapidly during training epochs, down to a nominal level, and the model MSE also decreases nominally rapidly down to a nominal level during validation. The first three measurement vectors of the 100 measurement vectors are illustratively provided as follows.

| | Down_Time | Resource_Utiliz | Nodal_Uptime | Cloud Provider |
| --- | --- | --- | --- | --- |
| 0 | 5.251629 | 8.546056 | 7.388638 | 0 |
| 1 | 4.576155 | 5.217505 | 10.444417 | 1 |
| 2 | 4.531898 | 5.982799 | 8.148502 | 2 |

For the above first three measurements, the deployment failure rates were as follows:
[0.66788864], [0.5637738], [0.52800834]

Similar to deployment rate, multi-cloud optimization code 200 may also predict response times of different components of different cloud service providers. Given that multi-cloud optimization code 200 may predict response times, multi-cloud optimization code 200 may minimize resource failures of applications, and/or total migration costs.

Figures 8, 9:
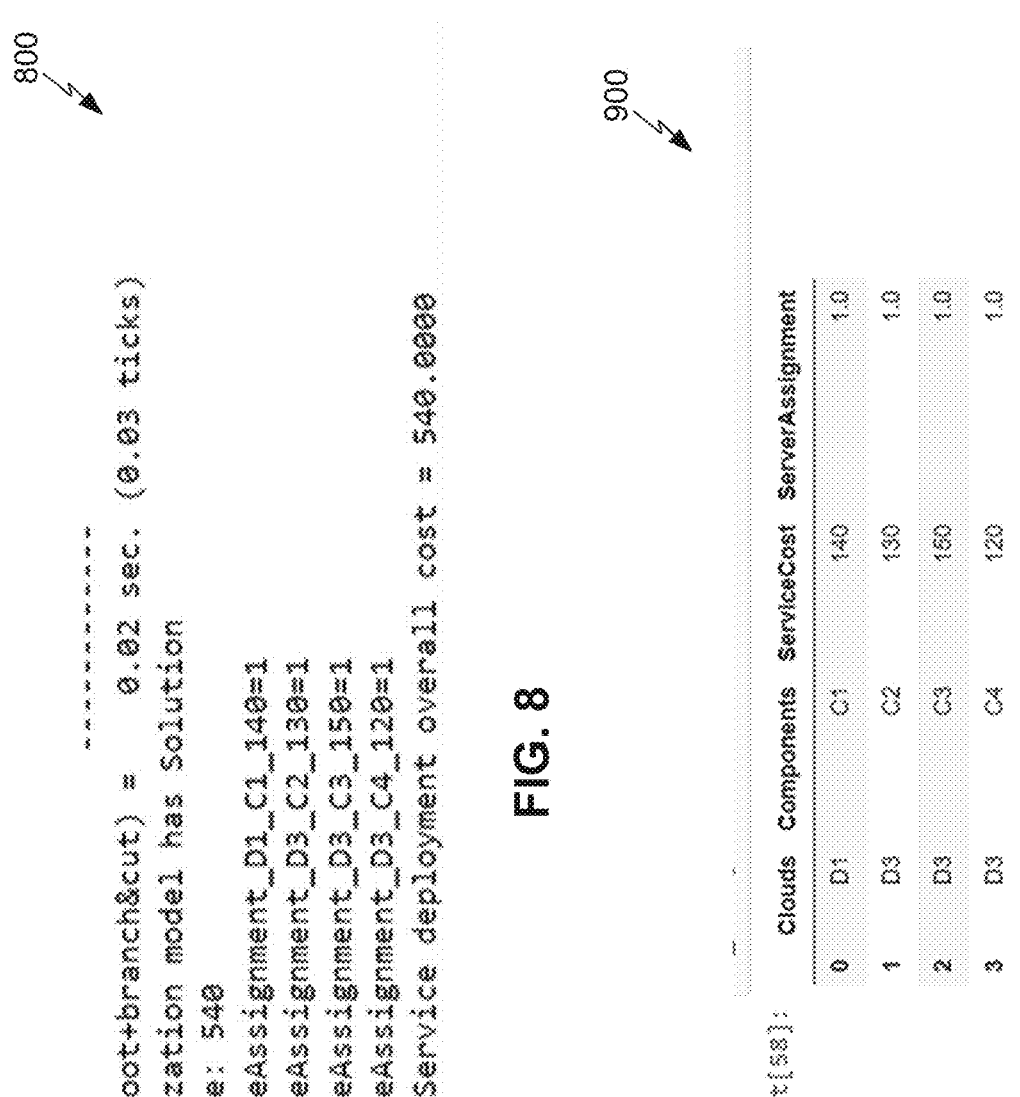
FIG. 8 depicts a printout for simulated example of deterministic optimization outputs for a multi-cloud deployment solution map, based on and resulting from a cloud deployment constraints data structure and on a cloud application component objective matrix, in accordance with illustrative aspects.
FIG. 9 depicts a chart for the simulated example of deterministic optimization outputs for the multi-cloud deployment solution map, based on and resulting from a cloud deployment constraints data structure and on a cloud application component objective matrix, in accordance with illustrative aspects.

Cloud mapping module 206 may optimize in part with regard to objective functions for minimizing cost of operations and for minimizing costs of migration for an application, and may perform deterministic optimization based on a cloud deployment constraints data structure and on a cloud application component objective matrix. FIG. 8 depicts a printout 800 for simulated example of deterministic optimization outputs for a multi-cloud deployment solution map, based on and resulting from a cloud deployment constraints data structure and on a cloud application component objective matrix, in accordance with illustrative aspects. FIG. 9 depicts a chart 900 for the simulated example of deterministic optimization outputs for the multi-cloud deployment solution map, based on and resulting from a cloud deployment constraints data structure and on a cloud application component objective matrix, in accordance with illustrative aspects. Cloud mapping module 206 has optimized the resulting generated multi-cloud deployment solution map among objective functions including minimizing cost of operations and for minimizing costs of migration and achieving a KPI criterion of the application service overall cost of 540 (in arbitrary custom total cost units), by deploying four application components C1-C4 to two different cloud services, D1 and D3, with component C1 deployed to cloud service D1 and components C2-C4 deployed to cloud service D3, which multi-cloud optimization code 200 has determined, after time epoch 50 (t[58]) of machine learning training (taking 0.02 seconds of machine learning training time), will incur total costs (in the custom units) of 140, 130, 150, and 120 for the deployments of components C1-C4, respectively, thereby hitting the criterion constraint target cost of 540.

This illustrates an example of cloud mapping module 206 generating predictions for future application deployment performance attributes for potential application deployment options. This simulated processing for an objective function for minimizing costs of migration for an application uses the following constraints: each component is assigned to single cloud service only; the response time of all the components of a multi-cloud deployed application together is less than that of the application as deployed on a single cloud service; and each hybrid cloud should be assigned at least one project application component. Finally, for application "Project 1," the same four components would be assigned deployments to cloud services optimizing among objective functions for the response time and service level agreement (SLA) for each cloud service. Cloud mapping module 206 of multi-cloud optimization code 200 may also extend this to further optimize for minimizing resource failure. Cloud mapping module 206 may derive by further optimizing among objective functions to minimize the overall cost of deployment given the constraints of the SLA. Cloud mapping module 206 and multi-cloud optimization code 200 may thus generate, based on the optimizing between the objective functions, a multi-cloud deployment map for the application Project 1 which includes the four indicated application components that are free to be deployed independently to different cloud services.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer 101 of FIG. 1, can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer 101 of FIG. 1, from a computer readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:

ingesting, by one or more processors, application deployment data for an application;

generating, by the one or more processors, a cloud application deployment predictor data structure for the application;

generating, by the one or more processors, objective functions for the cloud application deployment predictor data structure for the application, the objective functions minimizing (i) deployment failure rate, (ii) financial cost of migration and operation of the application, (iii) security bugs, (iv) response time, or (v) any combination thereof;

optimizing, by the one or more processors, between the objective functions for the application;

generating, by the one or more processors, based on the optimizing between the objective functions, a multi-cloud deployment map for the application by outputting optimized patterns for deploying the application and components of the application across a plurality of cloud services based on cosine similarity with at least another application or application components thereof, the cosine similarity being determined by measuring a set of weights used in the objective functions; and redeploying, by the one or more processors, the application among multiple cloud service providers in accordance with the multi-cloud deployment map for the application.

2. The method of claim 1, further comprising classifying the application deployment data in accordance with categories of attributes.

3. The method of claim 2, wherein the categories of attributes comprise application attributes, platform attributes, migration attributes, and service level objective (SLO) attributes.

4. The method of claim 1, wherein generating the cloud application deployment predictor data structure comprises performing machine learning training, using historical application deployment data and data related to scenarios absent from the historical data as machine learning training data, to create a predictor function based on one or more neural networks.

5. The method of claim 1, wherein generating the cloud application deployment predictor data structure comprises generating predictions for future application deployment performance attributes for potential application deployment options.

6. The method of claim 1, further comprising generating a cloud deployment constraints data structure comprising source cloud features, source cloud lock-in, destination cloud features, and destination cloud lock-in.

7. The method of claim 6, wherein optimizing between the objective functions comprises performing deterministic optimization based on the cloud deployment constraints data structure and on a cloud application component objective matrix, wherein the cloud application component objective matrix is based on the objective functions.

8. The method of claim 7, further comprising generating a data and environment type data structure, wherein optimizing between the objective functions further comprises performing the deterministic optimization based also on the data and environment type data structure.

9. The method of claim 1, wherein ingesting the application deployment data and generating the cloud application deployment predictor data structure comprises:

analyzing the application to determine constituent elements comprised in the application; and categorizing the constituent elements.

10. The method of claim 1, wherein the multi-cloud deployment map for the application comprises a designation for workloads requiring additional security to be hosted in encrypted cloud systems.

11. A computer program product comprising one or more computer readable storage media having program instructions collectively stored on the one or more computer readable storage media, the program instructions executable to:

ingest application deployment data for an application;

generate a cloud application deployment predictor data structure for the application;

generate objective functions for the cloud application deployment predictor data structure for the application, the objective functions minimizing (i) deployment failure rate, (ii) financial cost of migration and operation of the application, (iii) security bugs, (iv) response time, or (v) any combination thereof;

optimize between the objective functions for the application;

generate, based on the optimizing between the objective functions, a multi-cloud deployment map for the application by outputting optimized patterns for deploying the application and components of the application across a plurality of cloud services based on cosine similarity with at least another application or application components thereof, the cosine similarity being determined by measuring a set of weights used in the objective functions; and redeploy the application among multiple cloud service providers in accordance with the multi-cloud deployment map for the application.

12. The computer program product of claim 11, further comprising program instructions executable to:

classify the application deployment data in accordance with categories of attributes, wherein the categories of attributes comprise application attributes, platform attributes, migration attributes, and service level objective (SLO) attributes.

13. The computer program product of claim 11, wherein the program instructions executable to generate the cloud application deployment predictor data structure comprise program instructions executable to perform machine learning training, using at least some of the application deployment data as machine learning training data, to create a predictor function based on one or more neural networks.

14. The computer program product of claim 11, wherein the program instructions executable to generate the cloud application deployment predictor data structure comprise program instructions executable to generate predictions for future application deployment performance attributes for potential application deployment options.

15. The computer program product of claim 11, further comprising:

program instructions executable to generate a cloud deployment constraints data structure; and program instructions executable to generate a data and environment type data structure, wherein the program instructions executable to optimize between the objective functions comprise:

program instructions executable to perform deterministic optimization based on the cloud deployment constraints data structure and on a cloud application component objective matrix, wherein the cloud application component objective matrix is based on the objective functions; and program instructions executable to perform the deterministic optimization based also on the data and environment type data structure.

16. A system comprising:

one or more processors, one or more computer readable storage media, and program instructions collectively stored on the one or more computer readable storage media, the program instructions executable to:

ingest application deployment data for an application;

generate a cloud application deployment predictor data structure for the application;

generate objective functions for the cloud application deployment predictor data structure for the application, the objective functions minimizing (i) deployment failure rate, (ii) financial cost of migration and operation of the application, (iii) security bugs, (iv) response time, or (v) any combination thereof;

optimize between the objective functions for the application;

generate, based on the optimizing between the objective functions, a multi-cloud deployment map for the application by outputting optimized patterns for deploying the application and components of the application across a plurality of cloud services based on cosine similarity with at least another application or application components thereof, the cosine similarity being determined by measuring a set of weights used in the objective functions; and redeploy the application among multiple cloud service providers in accordance with the multi-cloud deployment map for the application.

17. The system of claim 16, further comprising program instructions executable to:

classify the application deployment data in accordance with categories of attributes, wherein the categories of attributes comprise application attributes, platform attributes, migration attributes, and service level objective (SLO) attributes.

18. The system of claim 16, wherein the program instructions executable to generate the cloud application deployment predictor data structure comprise program instructions executable to perform machine learning training, using at least some of the application deployment data as machine learning training data, to create a predictor function based on one or more neural networks.

19. The system of claim 16, wherein the program instructions executable to generate the cloud application deployment predictor data structure comprise program instructions executable to generate predictions for future application deployment performance attributes for potential application deployment options.

20. The system of claim 16, further comprising program instructions executable to:

generate a cloud deployment constraints data structure comprising source cloud features, source cloud lock-in, destination cloud features, and destination cloud lock-in, wherein the program instructions are further executable to optimize between the objective functions by performing deterministic optimization based on the cloud deployment constraints data structure and on a cloud application component objective matrix, wherein the cloud application component objective matrix is
based on the objective functions.

* * * * *